UNITED STATES PATENT OFFICE.

WILLIAM C. OBERWALDER, OF NEW YORK, N. Y.

COMPOSITION FOR CLEANING AND PRESERVING METALS.

SPECIFICATION forming part of Letters Patent No. 705,956, dated July 29, 1902.

Application filed February 7, 1902. Serial No. 93,076. (No specimens.)

*To all whom it may concern:*

Be it known that I, WILLIAM C. OBERWALDER, a citizen of the United States, and a resident of the city of New York, borough of Manhattan, in the county and State of New York, have invented a new and Improved Composition of Matter for Cleaning and Preserving Metals, of which the following is a full, clear, and exact description.

This invention relates to a composition of matter for cleaning metals, and is adapted especially for use in connection with silver and like precious metals.

By means of my invention the silver or other metal may not only be thoroughly and easily cleaned of the discoloring oxids and other accumulations adhering thereto, but the subsequent formation of these oxids may be effectively prevented.

The composition in its preferred form comprises: infusorial earth or other abrasive material, seven and one-half ounces, by weight; sulfate of soda, two ounces, by weight; borax, one-half ounce, by weight; soap or other soapy substance, ten ounces, by weight; pulverized camphor, one ounce, by weight. These ingredients and proportions have been found by experiments to give the best results, though they may be varied without producing a material change in the composition.

The composition is preferably made in plastic or semihard form and molded into cakes, so that it may be conveniently used.

To compound the ingredients above specified, I proceed as follows: To the infusorial earth, sulfate of soda, and borax I add enough water to dissolve the ingredients and bring them to a paste. I then dissolve the soap in hot water and add this to the paste formed as above, then mix the whole, and stir thoroughly to combine the ingredients. To this I add the pulverized camphor and thoroughly mix therein. The mass is then allowed to cool, after which it may be pressed into any desired form.

The camphor should be in powdered form before placing it in the composition. This is preferably effected by reducing the camphor in a mortar with a small quantity of alcohol—say approximately ten drops of alcohol to an ounce of camphor—and, if desired, about one-twentieth part, by weight, of carbonate of magnesium may be added to prevent the camphor from hardening. When the camphor is in this form, it is best fitted to be combined with the other ingredients. When the alcohol which is mixed with the camphor evaporates, the camphor resumes its original hardened crystallized state, and the carbonate of magnesium is added, as above explained, to prevent powdered camphor from adhering and forming lumps. If the carbonate of magnesium be not added, the powdered particles of the camphor when moistened by the alcohol would adhere, forming lumps, and when the alcohol evaporates these lumps would harden and the camphor therefore would not be equally distributed throughout the composition. This is overcome by the addition of the carbonate of magnesium, which prevents the adhesion of the particles of camphor, and consequently the formation of the camphor into lumps, which would harden as the alcohol evaporates.

The camphor constitutes an important element of the compound or composition, since it acts as a preventive (when the metal is once cleaned) to the formation of further accumulations. This result is due to the fact that the camphor (after being worked onto the surface of the metal during the cleaning operation, thereby charging the surface with camphor) prevents the action of the atmosphere in the formation of oxids. The camphor is further useful as a deodorizer, since it counteracts much of the odor arising from the chemical action of the sulfate of soda and borax acting on the oxids during the cleaning operation.

The soap is useful as a lubricant; but its principal purpose is to prevent the evaporation of the camphor. If the soap or its equivalent were omitted, the camphor would evaporate; but the soap incloses the particles of camphor and forms a perfect casing around the same, thereby retaining (after the ingredients have been thoroughly mixed) the proper proportion of camphor in the composition for any length of time.

The sulfate of soda and borax assist the action of the infusorial earth, the former acting as a solvent of the discoloring oxids, thereby loosening the oxid from the surface of the metal, which oxid is then mechanically removed by the abrasive influence of the infusorial earth.

The infusorial earth is preferably deprived of all particles of grit, so as to prevent scratching the soft metals. This is effected by mixing the earth with water and thoroughly stirring the whole. It is then allowed to settle, whereat the coarser particles are precipitated to the bottom of the mass. This settling operation requires about two hours, after which the upper portion may be removed and dried.

This composition of matter is harmless and will not roughen or affect the most delicate skin nor will it attack the silver or other metal on which it is used, its action being confined wholly to the discoloring oxids and other accumulations to which precious metals, particularly silver, are liable.

In the above description I have stated the most desirable proportions and form or condition for the substances used and the best manner of compounding them known to me. I desire it distinctly understood that these proportions and the process of manufacture may be varied at will without departing from the spirit of my invention and that various other changes and substitutions may be made, so long as the essentialities of the composition as set forth in my claims are retained.

Having thus described my invention, I claim as new and desire to secure by Letters Patent—

1. The composition of matter for cleaning and preserving the polish of metals, said composition consisting in an abrasive material, sulfate of soda, borax, pulverized camphor, and a soapy substance combined in essentially the proportions stated.

2. A composition of matter for cleaning and preserving and polishing metals, said composition consisting in an abrasive material, sulfate of soda, borax, pulverized camphor, carbonate of magnesium, and a soapy substance combined in essentially the proportions stated.

In testimony whereof I have signed my name to this specification in the presence of two subscribing witnesses.

WILLIAM C. OBERWALDER.

Witnesses:
I. B. OWENS,
EVERARD BOLTON MARSHALL.